(12) United States Patent
Kitawaki et al.

(10) Patent No.: US 11,423,937 B2
(45) Date of Patent: Aug. 23, 2022

(54) ALUMINUM ALLOY SUBSTRATE FOR MAGNETIC DISK, METHOD FOR PRODUCING THE SAME, AND MAGNETIC DISK USING ALUMINUM ALLOY SUBSTRATE FOR MAGNETIC DISK

(71) Applicants: UACJ CORPORATION, Tokyo (JP); FURUKAWA ELECTRIC CO., LTD., Tokyo (JP)

(72) Inventors: Kotaro Kitawaki, Tokyo (JP); Hideyuki Hatakeyama, Tokyo (JP); Takashi Nakayama, Tokyo (JP); Yasuo Fujii, Tokyo (JP); Wataru Kumagai, Tokyo (JP)

(73) Assignees: UACJ CORPORATION, Tokyo (JP); FURUKAWA ELECTRIC CO., LTD., Tokyo (JP)

( * ) Notice: Subject to any disclaimer, the term of this patent is extended or adjusted under 35 U.S.C. 154(b) by 334 days.

(21) Appl. No.: 16/644,612

(22) PCT Filed: May 15, 2018

(86) PCT No.: PCT/JP2018/018817
§ 371 (c)(1),
(2) Date: Mar. 5, 2020

(87) PCT Pub. No.: WO2019/064679
PCT Pub. Date: Apr. 4, 2019

(65) Prior Publication Data
US 2021/0065742 A1  Mar. 4, 2021

(30) Foreign Application Priority Data
Sep. 28, 2017 (JP) .............................. JP2017-189169

(51) Int. Cl.
B32B 15/01 (2006.01)
G11B 5/73 (2006.01)
(Continued)

(52) U.S. Cl.
CPC ........ G11B 5/73913 (2019.05); B32B 15/017 (2013.01); C22C 21/00 (2013.01);
(Continued)

(58) Field of Classification Search
None
See application file for complete search history.

(56) References Cited

U.S. PATENT DOCUMENTS 5,939,164 A    8/1999 Kubo et al.
10,767,247 B2 *  9/2020 Murata ............... C23C 18/1844
(Continued)

FOREIGN PATENT DOCUMENTS

JP    10102177 A    4/1998
JP    2002313061 A  10/2002
(Continued)

OTHER PUBLICATIONS

ISR issued in Int'l. application No. PCT/JP2018/018817, mailed Jul. 10, 2018.

*Primary Examiner* — Daniel J. Schleis
(74) *Attorney, Agent, or Firm* — Greer Burns & Crain Ltd.

(57) ABSTRACT

There are provided: an aluminum alloy substrate for a magnetic disk, the aluminum alloy substrate including an aluminum alloy including 0.4 to 3.0 mass % (hereinafter, "%") of Fe, less than 0.10% of Si, less than 0.10% of Mg, and the balance of Al and unavoidable impurities, in which an Al—Fe-based intermetallic compound having a longest diameter of 2 μm or more and less than 3 μm is dispersed at a distribution density of 1000 particles/mm$^2$ or more, and a (Continued)

Mg—Si-based intermetallic compound having a longest diameter of 1 μm or more is dispersed at a distribution density of 1 particle/mm$^2$ or less; a method for producing the same; and a magnetic disk in which an electroless Ni—P plating treatment layer and a magnetic layer thereon are disposed on a surface of the aluminum alloy substrate for a magnetic disk.

14 Claims, 1 Drawing Sheet

(51) Int. Cl.
*C22C 21/00* (2006.01)
*C22F 1/04* (2006.01)
*G11B 5/706* (2006.01)
*G11B 5/858* (2006.01)

(52) U.S. Cl.
CPC ............ *C22F 1/04* (2013.01); *G11B 5/70615* (2013.01); *G11B 5/73919* (2019.05); *G11B 5/858* (2013.01)

(56) References Cited

U.S. PATENT DOCUMENTS

| | | | |
|---|---|---|---|
| 11,211,086 B1* | 12/2021 | Uefune | .................... G11B 5/78 |
| 2002/0149876 A1 | 10/2002 | Sakata et al. | |
| 2017/0327930 A1 | 11/2017 | Kitawaki et al. | |

FOREIGN PATENT DOCUMENTS

| | | |
|---|---|---|
| WO | 2016068293 A1 | 5/2016 |
| WO | 2017163943 A1 | 9/2017 |

* cited by examiner

ALUMINUM ALLOY SUBSTRATE FOR MAGNETIC DISK, METHOD FOR PRODUCING THE SAME, AND MAGNETIC DISK USING ALUMINUM ALLOY SUBSTRATE FOR MAGNETIC DISK

This is a National Phase Application filed under 35 U.S.C. § 371, of International Application No. PCT/JP2018/018817, filed May 15, 2018, the contents of which are incorporated by reference.

TECHNICAL FIELD

The present disclosure relates to: an aluminum alloy substrate for a magnetic disk, having a favorable plating property and a favorable fluttering characteristic; a method for producing the same; and a magnetic disk using the aluminum alloy substrate for a magnetic disk.

BACKGROUND ART

Magnetic disks used in storage devices for computers are produced using substrates that have favorable plating properties and are excellent in mechanical characteristics and workability. For example, such a magnetic disk is produced with: a substrate based on an aluminum alloy according to JIS 5086 (including 3.5 to 4.5 mass % of Mg, 0.50 mass % or less of Fe, 0.40 mass % or less of Si, 0.20 to 0.70 mass % of Mn, 0.05 to 0.25 mass % of Cr, 0.10 mass % or less of Cu, 0.15 mass % or less of Ti, and 0.25 mass % or less of Zn with the balance of Al and unavoidable impurities); and the like.

Common magnetic disks are produced by first producing an annular aluminum alloy substrate, plating the aluminum alloy substrate, and then depositing a magnetic substance on a surface of the aluminum alloy substrate.

For example, a magnetic disk made of an aluminum alloy according to the JIS 5086 alloy is produced by the following production steps. First, an aluminum alloy material allowed to contain predetermined chemical components is cast to obtain an ingot, and the ingot is subjected to hot rolling and then to cold rolling to produce a rolled material having a thickness required for the magnetic disk. It is preferable to anneal the rolled material during the cold rolling and/or the like as needed. Then, the rolled material is stamped to have an annular shape. In order to eliminate distortion and/or the like occurring in the production steps, an aluminum alloy sheet allowed to have an annular shape is layered thereon, and the resultant is subjected to pressurization annealing in which the resultant is flattened by annealing the resultant while pressurizing both surfaces in both ends of the resultant. Thus, an annular aluminum alloy substrate is produced.

The annular aluminum alloy substrate produced in such a manner is subjected to cutting work, grinding work, degreasing, etching, and zincate treatment (Zn substitution treatment) as pretreatment and then to electroless plating with Ni—P which is a rigid non-magnetic metal as undercoat treatment. The plated surface is subjected to polishing, followed by sputtering a magnetic substance on the Ni—P electroless-plated surface, to produce the magnetic disk made of an aluminum alloy.

In recent years, larger-capacity, higher-density, and, in addition, higher-speed magnetic disks have been demanded due to the needs of multimedia and the like. The higher capacity has resulted in an increase in the number of magnetic disks placed in a storage device. Thus, thinned magnetic disks have also been demanded.

However, thinning and enhanced speed result in an increase in exciting force caused by an increase in fluid force due to decreased rigidity and high-speed rotation, thereby causing disk flutter to be more likely to occur. This is because high-speed rotation of magnetic disks causes unstable airflow to be generated between the disks, and the airflow results in vibration (fluttering) of the magnetic disks. Such a phenomenon is considered to occur because the low rigidity of a substrate results in the increased vibration of the magnetic disks, and a head is incapable of following such a variation. The occurrence of fluttering results in an increase in the positioning error of a head which is a reader. Therefore, reduction in disk flutter has been earnestly demanded.

In addition, the higher density of a magnetic disk results in a finer magnetic region per bit. Such a finer magnetic region causes a reading error to be more likely to occur due to the deviation of the positioning error of the head. Thus, a reduction in disk flutter which is the principal factor of the positioning error of the head has been earnestly demanded.

In addition, the higher density of a magnetic disk results in a minuter magnetic region per bit. Therefore, even a fine pit (hole) present on the plated surface of the magnetic disk causes an error at the time of reading data. Therefore, the plated surface of the magnetic disk is required to have a small number of pits and high smoothness.

In light of such actual circumstances, aluminum alloy substrates for magnetic disks with excellent plating properties and reduced disk flutter have been earnestly desired and examined in recent years. For example, it has been proposed that an airflow suppression component including a plate facing a disk is implemented in a hard disk drive. Patent Literature 1 proposes a magnetic disk apparatus in which an air spoiler is placed upstream of an actuator. The air spoiler weakens air flow toward the actuator on the magnetic disk to reduce the windage vibration of a magnetic head. In addition, the air spoiler weakens airflow on the magnetic disk, thereby suppressing disk flutter. Further, Patent Literature 2 proposes a method in which a large amount of Si contributing to improvement in the rigidity of an aluminum alloy sheet is allowed to be contained to improve the rigidity.

In the method disclosed in Patent Literature 1, however, a fluttering suppression effect is varied according to a variation in the spacing between the placed air spoiler and a substrate for a magnetic disk, the high precision of components is required, and therefore, an increase in component cost is caused.

The method in which a large amount of Si is allowed to be contained, described in Patent Literature 2, is effective for improving rigidity. In the method, however, it has been impossible to obtain objective, excellent plating properties under present circumstances.

CITATION LIST

Patent Literature

Patent Literature 1: Unexamined Japanese Patent Application Kokai Publication No. 2002-313061

Patent Literature 2: International Publication No. WO 2016-068293

SUMMARY OF INVENTION

Technical Problem

The present disclosure was made under such actual circumstances with an objective to provide an aluminum alloy substrate for a magnetic disk, having an excellent plating property and an excellent disk fluttering characteristic, a method for producing the same, and a magnetic disk using the aluminum alloy substrate for a magnetic disk.

Solution to Problem

In other words, claim 1 of the present disclosure describes an aluminum alloy substrate for a magnetic disk, the aluminum alloy substrate including an aluminum alloy including 0.4 to 3.0 mass % of Fe, less than 0.10 mass % of Si, less than 0.10 mass % of Mg, and a balance of Al and unavoidable impurities, wherein an Al—Fe-based intermetallic compound having a longest diameter of 2 µm or more and less than 3 µm is dispersed at a distribution density of 1000 particles/mm$^2$ or more, and a Mg—Si-based intermetallic compound having a longest diameter of 1 µm or more is dispersed at a distribution density of 1 particle/mm$^2$ or less.

Claim 2 of the present disclosure describes that the aluminum alloy further includes one or more selected from the group consisting of 0.1 to 3.0 mass % of Mn, 0.1 to 3.0 mass % of Ni, 0.005 to 1.000 mass % of Cu, 0.01 to 1.00 mass % of Cr, and 0.01 to 1.00 mass % of Zr, in accordance with claim 1.

Claim 3 of the present disclosure describes that the aluminum alloy further includes 0.005 to 1.000 mass % of Zn, in accordance with claim 1 or 2.

Claim 4 of the present disclosure describes that the aluminum alloy further includes one or more selected from the group consisting of Ti, B, and V in a total content of 0.005 to 0.500 mass % or less, in accordance with any one of claims 1 to 3.

Claim 5 of the present disclosure describes that a flatness is 30 µm or less, in accordance with any one of claims 1 to 4.

Claim 6 of the present disclosure describes that a tensile strength is 90 MPa or more, in accordance with any one of claims 1 to 5.

Claim 7 of the present disclosure describes a magnetic disk wherein an electroless Ni—P plating treatment layer and a magnetic layer thereon are disposed on a surface of the aluminum alloy substrate for a magnetic disk according to any one of claims 1 to 6.

Claim 8 of the present disclosure describes a method for producing an aluminum alloy substrate for a magnetic disk according to any one of claims 1 to 6, the method including: a casting step of casting an ingot by using the aluminum alloy; a hot-rolling step of hot-rolling the ingot; a cold-rolling step of cold-rolling a hot-rolled sheet; a disk blank stamping step of stamping the cold-rolled sheet to have an annular shape; a pressurization annealing step of subjecting a stamped disk blank to pressurization annealing; and a cutting and grinding step of subjecting the disk blank subjected to the pressurization annealing, to cutting work and grinding work, wherein the ingot is hot-rolled at a rolling reduction of 40% or more in a temperature range of 250 to 450° C. in the hot-rolling step.

Claim 9 of the present disclosure describes that a homogenization heat treatment step of heat-treating the ingot at 280 to 620° C. for 0.5 to 60 hours between the casting step and the hot-rolling step is further included, in accordance with claim 8.

Claim 10 of the present disclosure describes that an annealing treatment step of annealing the rolled sheet, the annealing treatment step being a batch annealing treatment step performed at 300 to 390° C. for 0.1 to 10 hours or a continuous annealing treatment step performed at 400 to 500° C. for 0 to 60 seconds, before or in the cold-rolling step, is further included, in accordance with claim 8 or 9.

Advantageous Effects of Invention

In accordance with the present disclosure, there can be provided an aluminum alloy substrate for a magnetic disk, having an excellent plating property and an excellent disk fluttering characteristic, a method for producing the same, and a magnetic disk using the aluminum alloy substrate for a magnetic disk.

DESCRIPTION OF EMBODIMENTS

The present inventors focused on the relationships between the plating property and fluttering characteristic of a substrate and the material of the substrate and intensively researched the relationships between such characteristics and the characteristics of the substrate (magnetic disk material). As a result, the content of Fe, Si, and Mg and the size distributions of an Al—Fe-based intermetallic compound and a Mg—Si-based intermetallic compound were found to greatly influence the plating property and the fluttering characteristic. As a result, the present inventors found that improvement in plating property and fluttering characteristic is achieved in an aluminum alloy substrate for a magnetic disk, in which the content of Fe is in a range of 0.40 to 3.00 mass % (hereinafter abbreviated as "%"), the content of Si content is in a range of less than 0.10%, the content of Mg is in a range of less than 0.10%, an Al—Fe-based intermetallic compound having a longest diameter of 2 µm or more and less than 3 µm is dispersed at a distribution density of 1000 particles/mm$^2$ or more, and a Mg—Si-based intermetallic compound having a longest diameter of 1 µm or more is dispersed at a distribution density of 1 particle/mm$^2$ or less. The present inventors thus accomplished the present disclosure on the basis of such findings.

A. Aluminum Alloy Substrate for Magnetic Disk

The aluminum alloy substrate for a magnetic disk according to the present disclosure (hereinafter, abbreviated as "aluminum alloy substrate according to the present disclosure" or simply as "aluminum alloy substrate") will be described in detail below.

1. Alloy Composition

The aluminum alloy components of the aluminum alloy substrate for a magnetic disk using an Al—Fe-based alloy according to the present disclosure, as well as the contents of the aluminum alloy components will be described below.

Fe:

Fe is an essential element, exists principally as second phase particles (Al—Fe-based intermetallic compound or the like), exists to be partly solid-dissolved in a matrix, and exhibits the effect of improving the strength and fluttering characteristic of the aluminum alloy substrate. Application of vibrations to such a material results in immediate absorption of vibrational energy due to viscous flow in the interface between the second phase particles and the matrix to obtain a very favorable fluttering characteristic. It is impossible to obtain a sufficient strength and a sufficient fluttering characteristic when the content of Fe in an aluminum alloy is less than 0.4%. In contrast, an Fe content of more than 3.0% results in generation of a large number of coarse Al—Fe-based intermetallic compound particles. Such coarse Al—Fe-based intermetallic compound particles fall off, thereby generating large recesses, in etching, zincate treatment, cutting work, and grinding work, and the deterioration of the smoothness of a plated surface and the peeling of plating occur due to generation of plating pits. In addition, workability is also deteriorated in a rolling step. Therefore, the content of Fe in the aluminum alloy is set in a range of 0.4 to 3.0%. The content of Fe is preferably in a range of 0.6 to 2.0% and more preferably in a range of 0.8 to 1.8%.

Si:

Si exists primarily as second phase particles (Si particles, Mg—Si-based intermetallic compound, or the like) and exhibits the effect of improving the strength and fluttering characteristic of the aluminum alloy substrate. However, the presence of a large amount of the Mg—Si-based intermetallic compound results in generation of fine pits on a plated surface, thereby deteriorating the smoothness of the plated surface. This is considered to be related to the change of the quality of a part of the Mg—Si-based intermetallic compound to Si—O before plating treatment, that is, to be because the high corrosion resistance of Si—O precludes removal of Si—O by plating pretreatment such as etching. The Mg—Si-based intermetallic compound existing on the surface of the aluminum alloy substrate is partly melted by plating pretreatment such as etching treatment, but is partly changed in quality to high-corrosion-resistant Si—O, which remains. As a result, the reaction of melting of an Al matrix is considered to occur concentratedly around Si—O. Further, in a portion in which Si—O has partly remained, the Al matrix is continuously melted during the plating treatment, and fine recesses mainly including Si—O are formed. The deposition of plating on the recesses is precluded by the continuous melting of the Al matrix. As a result, the fine pits are considered to be generated on the plated surface. A Si content of 0.10% or more in the aluminum alloy results in generation of a large amount of Mg—Si-based intermetallic compound, thereby generating fine pits on the plated surface and deteriorating the smoothness of the plated surface. Therefore, the content of Si in the aluminum alloy is set in a range of less than 0.10%. The content of Si is preferably restricted to 0.08% or less, and more preferably restricted to 0.02% or less. The lower limit value of Si is not particularly limited but is set at 0.01% in the present disclosure.

Mg:

Mg exists primarily as second phase particles (Mg—Si-based intermetallic compound or the like) and exhibits the effect of improving the strength and fluttering characteristic of the aluminum alloy substrate. However, the presence of a large amount of the Mg—Si-based intermetallic compound results in generation of fine pits on a plated surface, thereby deteriorating the smoothness of the plated surface. A Mg content of 0.10% or more in the aluminum alloy results in generation of a large amount of Mg—Si-based intermetallic compound, thereby generating fine pits on the plated surface and deteriorating the smoothness of the plated surface. Therefore, the content of Mg in the aluminum alloy is set in a range of less than 0.10%. The content of Mg is preferably restricted to 0.08% or less, and more preferably restricted to 0.02% or less. The lower limit value of Mg is not particularly limited but is set at 0.00% in the present disclosure.

One or more selected from the group consisting of 0.1 to 3.0% of Mn, 0.1 to 3.0% of Ni, 0.005 to 1.000% of Cu, 0.01 to 1.00% of Cr, and 0.01 to 1.00% of Zr may be further contained as first selective elements in order to further improve the plating property and fluttering characteristic of the aluminum alloy substrate for a magnetic disk. In addition, 0.005 to 1.000% of Zn may be further contained as a second selective element. Furthermore, one or more selected from the group consisting of Ti, B, and V in a total content of 0.005 to 0.500% may be further contained as third selective elements. The selective elements will be described below.

Mn:

Mn exists principally as second phase particles (Al—Mn-based intermetallic compound or the like) and exhibits the effect of improving the strength and fluttering characteristic of the aluminum alloy substrate. Application of vibrations to such a material results in immediate absorption of vibrational energy due to viscous flow in the interface between the second phase particles and the matrix to obtain a very favorable fluttering characteristic. The effect of improving the strength and fluttering characteristic of the aluminum alloy substrate can be further enhanced by allowing the content of Mn in the aluminum alloy to be 0.1% or more. In addition, generation of a large number of coarse Al—Mn-based intermetallic compound particles is inhibited by allowing the content of Mn in the aluminum alloy to be 3.0% or less. Such coarse Al—Mn-based intermetallic compound particles can be inhibited from falling off, thereby generating large recesses, in etching, zincate treatment, cutting work, and grinding work, and the deterioration of the smoothness of the plated surface and the peeling of the plating can be further inhibited from occurring. In addition, the deterioration of the workability in the rolling step can be further inhibited. Therefore, the content of Mn in the aluminum alloy is preferably set in a range of 0.1 to 3.0%, and more preferably set in a range of 0.1 to 1.0%.

Ni:

Ni exists principally as second phase particles (Al—Ni-based intermetallic compound or the like) and exhibits the effect of improving the strength and fluttering characteristic of the aluminum alloy substrate. Application of vibrations to such a material results in immediate absorption of vibrational energy due to viscous flow in the interface between the second phase particles and the matrix to obtain a very favorable fluttering characteristic. The effect of improving the strength and fluttering characteristic of the aluminum alloy substrate can be further enhanced by allowing the content of Ni in the aluminum alloy to be 0.1% or more. In addition, generation of a large number of coarse Al—Ni-based intermetallic compound particles is inhibited by allowing the content of Ni in the aluminum alloy to be 3.0% or less. Such coarse Al—Ni-based intermetallic compound particles can be inhibited from falling off, thereby generating large recesses, in etching, zincate treatment, cutting work, and grinding work, and the deterioration of the smoothness of the plated surface and the peeling of the plating can be further inhibited from occurring. In addition, the deterioration of the workability in the rolling step can be further inhibited. Therefore, the content of Ni in the aluminum alloy is preferably set in a range of 0.1 to 3.0%, and more preferably set in a range of 0.1 to 1.0%.

Cu:

Cu exists principally as second phase particles (Al—Cu-based intermetallic compound or the like) and exhibits the effect of improving the strength and fluttering characteristic of the aluminum alloy substrate. In addition, the amount of Al melted in zincate treatment is decreased. Furthermore, the effect of uniformly, thinly, and minutely depositing a zincate coating film to improve smoothness in a subsequent plating step is exhibited. The effect of improving the strength and fluttering characteristic of the aluminum alloy substrate and the effect of improving smoothness can be further enhanced by allowing the content of Cu in the aluminum alloy to be 0.005% or more. In addition, generation of a large number of coarse Al—Cu-based intermetallic compound particles is inhibited by allowing the content of Cu in the aluminum alloy to be 1.000% or less. Such coarse Al—Cu-based intermetallic compound particles can be inhibited from falling off, thereby generating large recesses, in etching, zincate treatment, cutting work, and grinding work, to further enhance the effect of improving the smoothness of the plated surface, and the peeling of the plating can be further inhibited from occurring. In addition, the deterioration of the workability in the rolling step can be further inhibited. Therefore, the content of Cu in the aluminum alloy is preferably set in a range of 0.005 to 1.000%, and more preferably set in a range of 0.005 to 0.400%.

Cr:

Cr exists principally as second phase particles (Al—Cr-based intermetallic compound or the like) and exhibits the effect of improving the strength and fluttering characteristic of the aluminum alloy substrate. The effect of improving the strength and fluttering characteristic of the aluminum alloy substrate can be further enhanced by allowing the content of Cr in the aluminum alloy to be 0.01% or more. In addition, generation of a large number of coarse Al—Cr-based intermetallic compound particles is inhibited by allowing the content of Cr in the aluminum alloy to be 1.00% or less. Such coarse Al—Cr-based intermetallic compound particles can be inhibited from falling off, thereby generating large recesses, in etching, zincate treatment, cutting work, and grinding work, and the deterioration of the smoothness of the plated surface and the peeling of the plating can be further inhibited from occurring. In addition, the deterioration of the workability in the rolling step can be further inhibited. Therefore, the content of Cr in the aluminum alloy is preferably set in a range of 0.01 to 1.00%, and more preferably set in a range of 0.10 to 0.50%.

Zr:

Zr exists principally as second phase particles (Al—Zr-based intermetallic compound or the like) and exhibits the effect of improving the strength and fluttering characteristic of the aluminum alloy substrate. The effect of improving the strength and fluttering characteristic of the aluminum alloy substrate can be further enhanced by allowing the content of Zr in the aluminum alloy to be 0.01% or more. In addition, generation of a large number of coarse Al—Zr-based intermetallic compound particles is inhibited by allowing the content of Zr in the aluminum alloy to be 1.00% or less. Such coarse Al—Zr-based intermetallic compound particles can be inhibited from falling off, thereby generating large recesses, in etching, zincate treatment, cutting work, and grinding work, and the deterioration of the smoothness of the plated surface and the peeling of the plating can be further inhibited from occurring. In addition, the deterioration of the workability in the rolling step can be further inhibited. Therefore, the content of Zr in the aluminum alloy is preferably set in a range of 0.01 to 1.00%, and more preferably set in a range of 0.10 to 0.50%.

Zn:

Zn exhibits the effects of decreasing the amount of Al melted in zincate treatment and of uniformly, thinly, and minutely depositing a zincate coating film to improve smoothness and adhesiveness in the subsequent plating step. In addition, Zn forms second phase particles together with other added elements and exhibits the effect of improving the fluttering characteristic. The effects of decreasing the amount of Al melted in the zincate treatment and of uniformly, thinly, and minutely depositing the zincate coating film to improve the smoothness of the plating can be further enhanced by allowing the content of Zn in the aluminum alloy to be 0.005% or more. By allowing the content of Zn in the aluminum alloy to be 1.000% or less, the zincate coating film becomes uniform to enable the smoothness of the plated surface to be further inhibited from deteriorating, and the plating can be further inhibited from peeling. Therefore, the content of Zn in the aluminum alloy is preferably set in a range of 0.005 to 1.000%, and more preferably set in a range of 0.100 to 0.700%.

Ti, B, V

Ti, B, and V form second phase particles (such as borides such as $TiB_2$, and $Al_3Ti$ and Ti—V—B particles), which become crystal grain nuclei, in a solidification process in casting, and therefore enable crystal grains to be finer. As the result, plating properties are improved. In addition, the effect of reducing nonuniformity in the sizes of the second phase particles to reduce unevenness in strength and fluttering characteristic in the aluminum alloy substrate is exhibited by allowing the crystal grains to be finer. However, it is impossible to obtain the above-described effects when the total of the contents of Ti, B, and V is less than 0.005%. In contrast, even when the total of the contents of Ti, B, and V is more than 0.500%, the effects are saturated, and it is impossible to obtain further noticeable improvement effects. Therefore, the total of the contents of Ti, B, and V in the case of adding Ti, B, and V is preferably set in a range of 0.005 to 0.500%, and more preferably set in a range of 0.005 to 0.100%. When only any one of Ti, B, and V is contained, the total refers to the content of the one; when any two thereof are contained, the total refers to the total of the two; and when all the three thereof are contained, the total refers to the total of the three.

Other Elements:

In addition, the balance of the aluminum alloy used in the present disclosure consists of Al and unavoidable impurities. In such a case, examples of the unavoidable impurities include Ga and Sn, and the characteristics of the aluminum alloy substrate obtained in the present disclosure are not deteriorated when each and the total of the unavoidable impurities are less than 0.10% and less than 0.20%, respectively.

2. Distribution State of Intermetallic Compound

The distribution state of the intermetallic compound in the aluminum alloy substrate for a magnetic disk according to the present disclosure will now be described.

In the metal structure of the aluminum alloy substrate for a magnetic disk according to the present disclosure, an Al—Fe-based intermetallic compound having a longest diameter of 2 μm or more and less than 3 μm is dispersed at a distribution density of 1000 particles/mm$^2$ or more, and a Mg—Si-based intermetallic compound having a longest diameter of 1 μm or more is dispersed at a distribution density of 1 particle/mm$^2$ or less.

In such a case, the intermetallic compound described above means the second phase particles of precipitates or crystallized products. Specifically, examples of the Al—Fe-based intermetallic compound include $Al_3Fe$, $Al_6Fe$, $Al_6$(Fe, Mn), Al—Fe—Si, Al—Fe—Mn—Si, Al—Fe—Ni, and Al—Cu—Fe, and the Mg—Si-based intermetallic compound refers to, for example, particles of as $Mg_2Si$ and the like. The aluminum alloy substrate according to the present disclosure contains an intermetallic compound such as an Al—Mn-based intermetallic compound ($Al_6Mn$ or Al—Mn—Si), an Al—Ni-based intermetallic compound ($Al_3Ni$ or the like), an Al—Cu-based intermetallic compound ($Al_2Cu$ or the like), an Al—Cr-based intermetallic compound (Al$_7$Cr or the like), or an Al—Zr-based intermetallic compound (Al$_3$Zr or the like), as well as the Al—Fe-based intermetallic compound and Mg—Si-based intermetallic compound described above. The second phase particles also include Si particles and the like, as well as the intermetallic compounds described above.

In the metal structure of the aluminum alloy substrate for a magnetic disk according to the present disclosure, the Al—Fe-based intermetallic compound having a longest diameter of 2 μm or more and less than 3 μm is dispersed at a distribution density of 1000 particles/mm$^2$ or more, and the Mg—Si-based intermetallic compound having a longest diameter of 1 μm or more is dispersed at a distribution density of 1 particle/mm$^2$ or less. The definition of the sizes and distribution states (surface densities) of the predetermined intermetallic compounds causes the number of fine pits on the plated surface to be decreased to improve the smoothness of the plated surface.

It is considered that a cathode reaction and an anode reaction (melting of Al matrix) occur on and around the intermetallic compounds, respectively, in, for example, etching in plating pretreatment, in the Al—Fe-based intermetallic compound. It is considered that when the amount of the Al—Fe-based intermetallic compound having a longest diameter of 2 μm or more and less than 3 μm is small, the cathode and anode reactions concentratedly occur, thereby generating large recesses and generating fine pits on the plated surface, because the number of sites in which the cathode and anode reactions occur is small. In contrast, it is considered that when the amount of the Al—Fe-based intermetallic compound having a longest diameter of 2 μm or more and less than 3 μm is large, the cathode and anode reactions are dispersed, thereby precluding the generation of the large recesses and decreasing the number of the fine pits on the plated surface, because the number of sites in which the cathode and anode reactions occur is large.

When the Al—Fe-based intermetallic compound having a longest diameter of 2 μm or more and less than 3 μm is dispersed at a low distribution density of less than 1000 particles/mm$^2$, fine pits are generated on the plated surface, thereby deteriorating the smoothness of the plated surface. Therefore, the distribution density of the Al—Fe-based intermetallic compound having a longest diameter of 2 μm or more and less than 3 μm is set at 1000 particles/mm$^2$ or more. In addition, the distribution density of the Al—Fe-based intermetallic compound having a longest diameter of 2 μm or more and less than 3 μm is preferably in a range of 3000 particles/mm$^2$ or more, and more preferably in a range of 5000 particles/mm$^2$ or more. The upper limit of the distribution density is not particularly limited. However, an increase in the distribution density is more likely to result in generation of coarse plating pits, and a distribution density of more than 50000 particles/mm$^2$ may result in the deterioration of the smoothness of the plated surface. Therefore, the upper limit of the distribution density of the Al—Fe-based intermetallic compound having a longest diameter of 2 μm or more and less than 3 μm is preferably 50000 particles/mm$^2$.

When the longest diameter of the Al—Fe-based intermetallic compound existing in the metal structure of the aluminum alloy substrate is less than 2 μm, it is impossible to obtain the effect of inhibiting the generation of large recesses because the longest diameter is too small in view of sites in which the cathode and anode reactions occur. In contrast, when the longest diameter is 3 μm or more, it is also impossible to obtain the effect of inhibiting the generation of large recesses because the cathode and anode reactions excessively actively occur. Accordingly, the distribution density of the Al—Fe-based intermetallic compound having a longest diameter of 2 μm or more and less than 3 μm is defined in the present disclosure. An Al—Fe-based intermetallic compound having a longest diameter of 3 μm or more exists; however, an increased longest diameter is more likely to result in generation of coarse plating pits, and a longest diameter of more than 50 μm may result in the deterioration of the smoothness of the plated surface. Therefore, it is preferable that any Al—Fe-based intermetallic compound having a longest diameter of 50 μm or more does not exist.

The Mg—Si-based intermetallic compound primarily causes generation of fine pits, thereby deteriorating the smoothness of the plated surface, as described above. Therefore, the distribution density of the Mg—Si-based intermetallic compound having a longest diameter of 1 μm or more is set at 1 particle/mm$^2$ or less. In addition, the distribution density of the Mg—Si-based intermetallic compound having a longest diameter of 1 μm or more is preferably 0 particle/mm$^2$.

A case in which the longest diameter of the Mg—Si-based intermetallic compound existing in the metal structure of the aluminum alloy substrate is less than 1 μm has no large influence on generation of plating pits because the size of the Mg—Si-based intermetallic compound is small. The upper limit of the longest diameter of the Mg—Si-based intermetallic compound is not particularly limited. However, an increase in the large longest diameter is more likely to result in generation of coarse plating pits, and a longest diameter of more than 20 μm may result in the deterioration of the smoothness of the plated surface due to the coarse plating pits. Therefore, the presence of a Mg—Si-based intermetallic compound having a longest diameter of more than 20 μm is required to be prevented in view of inhibiting the generation of the coarse plating pits. Accordingly, the upper limit of the longest diameter is preferably set at 20 μm in the present disclosure in which the generation of fine pits is inhibited.

In a planar image of an intermetallic compound observed with an optical microscope, first, a maximum value of the distance between one point on a contour and another point on the contour is measured, such maximum values with regard to all the points on the contour are then measured, and the highest value is finally selected from all the maximum values; and the longest diameter refers to the highest value in the present disclosure.

3. Fluttering Characteristic

Fluttering characteristics will now be described. Such fluttering characteristics are also influenced by the motor characteristics of a hard disk drive. In the present disclosure, the fluttering characteristic is preferably 50 nm or less, and more preferably 30 nm or less, in air. A fluttering characteristic of 50 nm or less is considered to be acceptable for use for common HDDs. A fluttering characteristic of more than 50 nm results in an increase in the positioning error of a head which is a reader.

In addition, the fluttering characteristic is preferably 30 nm or less, and more preferably 20 nm or less, in helium. A fluttering characteristic of 30 nm or less is considered to be acceptable for use for common HDDs. A fluttering characteristic of more than 30 nm results in an increase in the positioning error of the head which is the reader.

A required fluttering characteristic varies according to a hard disk drive used, and therefore, the distribution states of the intermetallic compounds may be determined as appropriate on the basis of the fluttering characteristic. Such fluttering characteristics can be obtained by appropriately adjusting each of the contents of added elements, as well as each of a casting method including a cooling rate in casting, and a heat history and a working history in subsequent heat treatment and working, described below.

In an embodiment of the present disclosure, the thickness of the aluminum alloy substrate is preferably 0.45 mm or more. When the thickness of the aluminum alloy substrate is less than 0.45 mm, the substrate may be deformed by accelerating force caused by, for example, drop occurring in, for example, installation of a hard disk drive, except in a case in which the deformation can be inhibited by further increasing proof stress. A case in which the thickness of the aluminum alloy substrate is more than 1.30 mm is not preferred because of resulting in a decrease in the number of disks that can be mounted in a hard disk although resulting in improvement in fluttering characteristic. Accordingly, the thickness of the aluminum alloy substrate is more preferably set at 0.45 to 1.30 mm, and still more preferably set at 0.50 to 1.00 mm.

Fluid force can be decreased by filling helium into a hard disk. This is because the gas viscosity of helium is as low as about ⅛ of the gas viscosity of air. Fluttering generated by gas flow associated with the rotation of the hard disk is reduced by decreasing the fluid force of the gas.

4. Flatness

The flatness of the aluminum alloy substrate for a magnetic disk according to the present disclosure will now be described.

The aluminum alloy substrate for a magnetic disk according to the present disclosure preferably has a flatness of 30 μm or less. In such a case, the effect of further improving the smoothness of the plated surface of the aluminum alloy substrate is exhibited. When the flatness of the aluminum alloy substrate is more than 30 μm, an uncut portion is generated in surface polishing performed for improving smoothness after plating treatment. As a result, fine pits may be generated on the plated surface, thereby deteriorating the smoothness of the plated surface. Therefore, the flatness of the aluminum alloy substrate is preferably set at 30 μm or less, and more preferably set at 20 μm or less. A lower flatness is preferred. However, it is difficult to set the flatness at 0 μm. The lower limit of the flatness is not particularly limited but is preferably around 1 μm in the present disclosure.

5. Tensile Strength

The tensile strength of the aluminum alloy substrate for a magnetic disk according to the present disclosure will now be described.

The aluminum alloy substrate for a magnetic disk according to the present disclosure preferably has a tensile strength of 90 MPa or more. In such a case, the effect of further reducing scratches formed on a surface of the substrate in a step of producing a magnetic disk is exhibited. When the tensile strength of the aluminum alloy substrate is less than 90 MPa, a surface is scratched due to application of external force in conveyance, grinding, or the like. As a result, fine pits may be generated on the plated surface, thereby deteriorating the smoothness of the plated surface. Therefore, the tensile strength of the aluminum alloy substrate is preferably 90 MPa or more, and more preferably 110 MPa or more. The upper limit of the tensile strength is not particularly limited but is logically determined depending on alloy composition and production conditions, and is around 300 MPa in the present disclosure.

B. Method for Producing Aluminum Alloy Substrate for Magnetic Disk

Each of steps for producing the aluminum alloy substrate for a magnetic disk according to the present disclosure, and the process conditions of the steps will be described in detail below.

Figure 1:
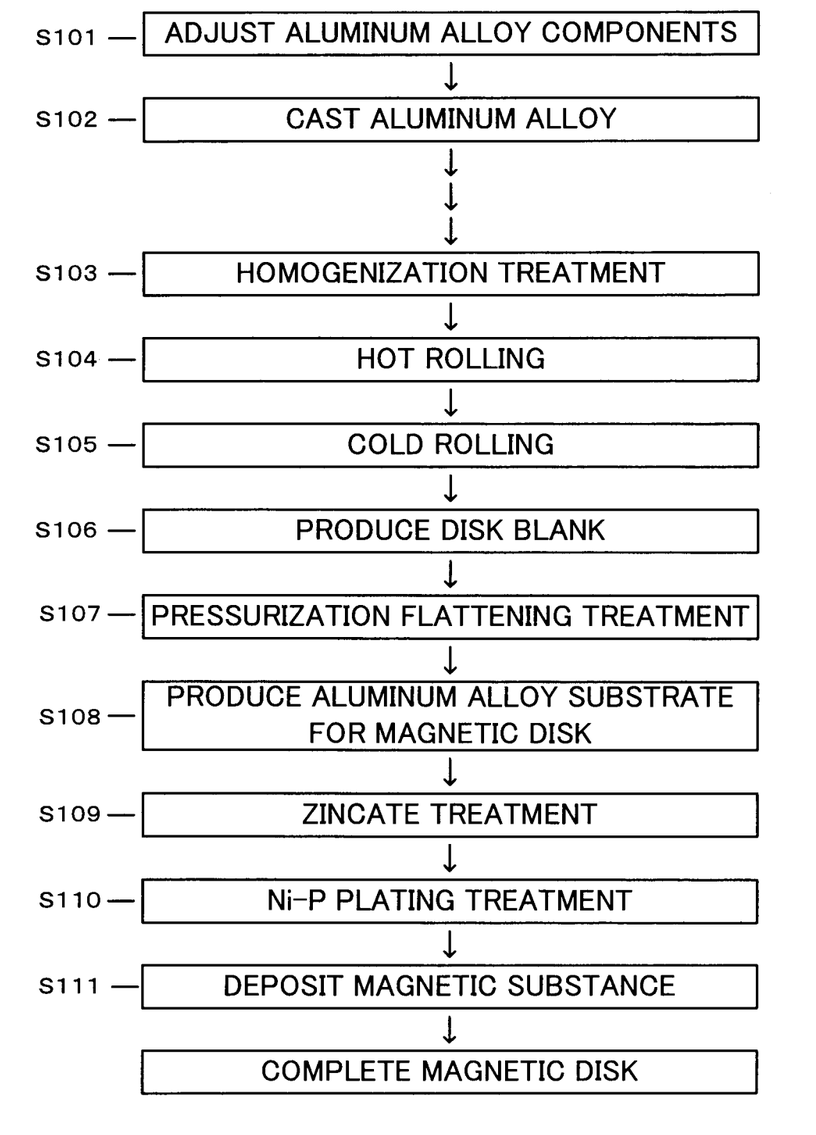
FIG. 1 is a flow diagram illustrating a method for producing an aluminum alloy substrate for a magnetic disk and a magnetic disk according to the present disclosure.

A method for producing a magnetic disk by using the aluminum alloy substrate will be described with reference to a flow in FIG. 1. In such a case, preparation of aluminum alloy components (step S101) to cold rolling (step S105) are steps for producing an aluminum alloy sheet, and production of a disk blank (step S106) to deposition of a magnetic substance (step S111) are steps for making the produced aluminum alloy sheet into a magnetic disk.

The steps for producing an aluminum alloy sheet will be first described. First, a molten metal of an aluminum alloy material having the component composition described above is prepared by heating and melting according to a usual method (step S101). Then, an aluminum alloy is cast from the prepared molten metal of the aluminum alloy material by a semi-continuous casting (DC casting) method, a continuous casting (CC casting) method, or the like (step S102). The DC casting method and the CC casting method are as follows.

In the DC casting method, the heat of the molten metal poured through a spout is removed by a bottom block, the wall of a water-cooled mold, and cooling water directly discharged to the outer periphery of an ingot, and the molten metal is solidified and drawn downward as the ingot.

In the CC casting method, the molten metal is supplied into between a pair of rolls (or a belt caster and a block caster) through a casting nozzle, and a thin sheet is directly cast by removal of heat from the rolls.

A point of great difference between the DC casting method and the CC casting method is a cooling rate in casting. A feature of the CC casting method in which the cooling rate is high is in that the sizes of second phase particles in the CC casting method are smaller than those in the DC casting.

Then, homogenization heat treatment of the cast aluminum alloy ingot is performed as needed (step S103). In the case of performing the homogenization heat treatment, the heat treatment is performed at 280 to 620° C. for 0.5 to 60 hours, and preferably at 280 to 620° C. for 1.0 to 50 hours. In the case of a heating temperature of less than 280° C. or a heating time of less than 0.5 hours in the homogenization heat treatment, the homogenization heat treatment may become insufficient, thereby increasing unevenness in the plating property and fluttering characteristic of each aluminum alloy substrate. When the heating temperature in the homogenization heat treatment is more than 620° C., melting may occur. Even when the heating time in the homogenization heat treatment is more than 60 hours, such effects are saturated, and it is impossible to obtain further noticeable improvement effects.

Then, the aluminum alloy subjected to the homogenization heat treatment as needed is made into a sheet material in a hot-rolling step (step S104). In the hot-rolling step, hot rolling is performed at a rolling reduction of 40% or more in a temperature range of 250 to 450° C. The performance of the hot rolling at a rolling reduction of 40% or more in a temperature range of 250 to 450° C. causes an originally existing coarse Al—Fe-based intermetallic compound to be ground and made to be finer, thereby finally enabling the distribution density of the Al—Fe-based intermetallic compound having a longest diameter of 2 μm or more and less than 3 μm to be 1000 particles/mm² or more to improve the smoothness of the plated surface.

In the case of a rolling reduction of less than 40% in a temperature range of 250 to 450° C. or less, the coarse Al—Fe-based intermetallic compound is insufficiently made to be finer by the pulverization of the coarse Al—Fe-based intermetallic compound, whereby the smoothness of the plated surface is deteriorated. In addition, when the hot rolling is performed at a temperature of less than 250° C., it is difficult to set the rolling reduction at 40% or more because the deformation resistance of a material is increased. In contrast, when the hot rolling is performed at a temperature of more than 450° C., the coarse Al—Fe-based intermetallic compound is insufficiently made to be finer by the pulverization of the coarse Al—Fe-based intermetallic compound, whereby the smoothness of the plated surface is deteriorated. As described above, the hot rolling is performed at a rolling reduction of 40% or more in a temperature range of 250 to 450° C. The rolling reduction of the hot rolling in a temperature range of 250 to 450° C. is preferably 50% or more, and more preferably 60% or more. In addition, the hot-rolling temperature at a rolling reduction of 40% or more is preferably in a temperature range of 250 to 430° C., and more preferably in a temperature range of 250 to 400° C. A hot-rolling start temperature of 280 to 600° C. and a hot-rolling end temperature of 150 to 400° C. are preferred for performing the hot rolling at a rolling reduction of 40% or more in a temperature range of 250 to 450° C. The hot-rolling temperature can be in a range of 150 to 600° C., a rolling reduction of 40% or more at 250 to 450° C. in the temperature range enables the distribution density of the Al—Fe-based intermetallic compound having a longest diameter of 2 μm or more and less than 3 μm to be 1000 particles/mm² or more, thereby improving the smoothness of the plated surface.

Then, cold rolling of the hot-rolled sheet material is performed to make an aluminum alloy sheet of around 1.3 mm to 0.45 mm (step S105). The sheet is finished to have a needed product sheet thickness by the cold rolling after the end of the hot rolling. The conditions of the cold rolling are not particularly limited but may be determined depending on a needed product sheet strength and sheet thickness, and a rolling reduction is preferably set at 10 to 95%. Before or in the cold rolling, annealing treatment may be performed to secure cold-rolling workability. The annealing treatment is preferably performed under conditions of 300 to 390° C. and 0.1 to 10 hours in the case of, for example, batch-type heating and is preferably performed under conditions of retention at 400 to 500° C. for 0 to 60 seconds in the case of continuous heating. In such a case, a retention time of 0 seconds means that heating retention is stopped just after reaching the heating temperature, and cooling is performed.

The step of producing, into a magnetic disk, the aluminum alloy sheet produced in such a manner as described above. In order to work the aluminum alloy sheet for the magnetic disk, the aluminum alloy sheet is stamped in an annular shape to produce a disk blank (step S106). Then, the disk blank is subjected to pressurization annealing in atmospheric air at 100 to 390° C. for 30 minutes or more to produce a flattened blank (step S107). Then, the blank is subjected to cutting work, grinding work, and, preferably, strain-removing heat treatment at a temperature of 250 to 400° C. for 5 to 15 minutes in the order mentioned above to produce an aluminum alloy substrate (step S108). Then, a surface of the aluminum alloy substrate is subjected to degreasing, acid-etching treatment, desmut treatment, and zincate treatment (Zn substitution treatment) (step S109).

In a degreasing treatment stage, the degreasing is preferably performed under conditions of a temperature of 40 to 70° C., a treatment time of 3 to 10 minutes, and a concentration of 200 to 800 mL/L by using commercially available AD-68F (manufactured by C. Uyemura & Co., Ltd.) degreasing liquid or the like. In an acid-etching treatment stage, the acid-etching is preferably performed under conditions of a temperature 50 to 75° C., a treatment time of 0.5 to 5 minutes, and a concentration of 20 to 100 mL/L by using commercially available AD-107F (manufactured by C. Uyemura & Co., Ltd.) etching liquid or the like. After the acid-etching treatment, the desmut treatment is preferably performed using $HNO_3$ as usual desmut treatment under conditions of a temperature of 15 to 40° C., a treatment time of 10 to 120 seconds, and a concentration of 10 to 60% when a compound removal step has already been applied. When the compound removal step has not been applied, the compound removal treatment described above may be performed instead of or in addition to the desmut treatment.

A first zincate treatment stage is preferably performed under conditions of a temperature of 10 to 35° C., a treatment time of 0.1 to 5 minutes, and a concentration of 100 to 500 mL/L by using commercially available AD-301F-3X (manufactured by C. Uyemura & Co., Ltd.) zincate treatment liquid or the like. After the first zincate treatment stage, Zn peeling treatment is preferably performed under conditions of a temperature of 15 to 40° C., a treatment time of 10 to 120 seconds, and a concentration of 10 to 60% by using $HNO_3$. Then, a second zincate treatment stage is performed under the same conditions as those of the first zincate treatment.

The surface of the aluminum alloy substrate subjected to the second zincate treatment is subjected to an electroless Ni—P plating treatment step as undercoat plating treatment (S110). As the electroless Ni—P plating treatment, plating treatment is preferably performed under conditions of a temperature of 80 to 95° C., a treatment time of 30 to 180 minutes, and a Ni concentration of 3 to 10 g/L by using commercially available NIMUDEN HDX (manufactured by C. Uyemura & Co., Ltd.) plating liquid or the like. The aluminum alloy substrate for a magnetic disk subjected to the undercoat plating treatment is obtained in such an electroless Ni—P plating treatment step.

C. Magnetic Disk

Finally, the surface of the aluminum alloy substrate for a magnetic disk subjected to the undercoat plating treatment is smoothed by polishing, and a magnetic medium including an undercoat layer, a magnetic layer, a protective film, a lubricant layer, and the like is deposited on the surface by sputtering to make a magnetic disk (step S111).

After the aluminum alloy sheet has been made (S105), the aluminum alloy sheet is not exposed to a temperature of more than 400° C., and therefore, the distribution and components of the compound are not changed. Accordingly, the distribution and components of the compound, and the like may be evaluated using the aluminum alloy sheet (S105), the disk blank (step S106), the aluminum alloy substrate (step S110), or the magnetic disk (step S111) instead of the aluminum alloy substrate (S108).

EXAMPLES

The present disclosure will be described in more detail below with reference to examples. However, the present disclosure is not limited thereto.

The examples of the aluminum alloy substrate for a magnetic disk will be described. Each alloy material with component composition set forth in Tables 1 to 3 was melted to make a molten aluminum alloy according to a usual method (step S101). In Tables 1 to 3, "-" denotes a measurement limit value or less.

TABLE 1

Component Composition (mass %)

| Alloy No. | Fe | Mn | Si | Ni | Cu | Mg | Cr | Zr | Zn | Ti | B | V | Ti + B + V | Al + unavoidable impurities |
|---|---|---|---|---|---|---|---|---|---|---|---|---|---|---|
| A1 | 0.4 | — | 0.09 | — | — | 0.09 | — | — | — | — | — | — | 0.000 | Bal. |
| A2 | 0.6 | 0.2 | 0.08 | — | — | 0.08 | — | — | 0.230 | — | — | — | 0.000 | Bal. |
| A3 | 0.8 | — | 0.06 | — | — | 0.06 | — | — | 0.230 | — | — | — | 0.000 | Bal. |
| A4 | 0.9 | — | 0.06 | 0.2 | — | 0.06 | — | — | 0.230 | — | — | — | 0.000 | Bal. |
| A5 | 1.0 | — | 0.04 | — | 0.020 | 0.06 | — | — | 0.230 | — | — | — | 0.000 | Bal. |
| A6 | 1.2 | — | 0.01 | — | — | 0.06 | — | — | 0.230 | — | — | — | 0.000 | Bal. |
| A7 | 1.5 | — | 0.06 | — | — | 0.06 | 0.20 | — | 0.230 | — | — | — | 0.000 | Bal. |
| A8 | 1.8 | — | 0.06 | — | — | 0.04 | — | 0.20 | 0.230 | — | — | — | 0.000 | Bal. |
| A9 | 2.0 | — | 0.06 | — | — | 0.02 | — | — | 0.230 | — | — | — | 0.000 | Bal. |
| A10 | 2.9 | — | 0.06 | — | — | 0.00 | — | — | 0.230 | 0.060 | 0.001 | 0.020 | 0.081 | Bal. |
| A11 | 1.5 | 0.1 | 0.06 | — | — | 0.06 | — | — | 0.230 | — | — | — | 0.000 | Bal. |
| A12 | 1.5 | 0.3 | 0.06 | — | — | 0.06 | — | — | 0.230 | — | — | — | 0.000 | Bal. |
| A13 | 1.5 | 0.6 | 0.06 | — | — | 0.06 | — | — | 0.230 | — | — | — | 0.000 | Bal. |
| A14 | 1.5 | 1.5 | 0.06 | — | — | 0.06 | — | — | 0.230 | — | — | — | 0.000 | Bal. |
| A15 | 1.5 | 2.9 | 0.06 | — | — | 0.06 | — | — | 0.230 | — | — | — | 0.000 | Bal. |
| A16 | 1.5 | — | 0.06 | — | — | 0.06 | — | — | 0.230 | — | — | — | 0.000 | Bal. |
| A17 | 1.5 | — | 0.06 | — | — | 0.06 | — | — | 0.230 | — | — | — | 0.000 | Bal. |
| A18 | 1.5 | — | 0.06 | 0.1 | — | 0.06 | — | — | 0.230 | — | — | — | 0.000 | Bal. |
| A19 | 1.5 | — | 0.06 | 1.0 | — | 0.06 | — | — | 0.230 | — | — | — | 0.000 | Bal. |
| A20 | 1.5 | — | 0.06 | 2.9 | — | 0.06 | — | — | 0.230 | — | — | — | 0.000 | Bal. |
| A21 | 1.5 | — | 0.06 | — | 0.005 | 0.06 | — | — | 0.230 | — | — | — | 0.000 | Bal. |
| A22 | 1.5 | — | 0.06 | — | 0.020 | 0.06 | — | — | 0.230 | — | — | — | 0.000 | Bal. |
| A23 | 1.5 | — | 0.06 | — | 0.150 | 0.06 | — | — | 0.230 | — | — | — | 0.000 | Bal. |
| A24 | 1.5 | — | 0.06 | — | 0.950 | 0.06 | — | — | 0.230 | — | — | — | 0.000 | Bal. |
| A25 | 1.5 | — | 0.06 | — | — | 0.06 | — | — | 0.230 | — | — | — | 0.000 | Bal. |
| A26 | 1.5 | — | 0.06 | — | — | 0.06 | — | — | 0.230 | — | — | — | 0.000 | Bal. |
| A27 | 1.5 | — | 0.06 | — | — | 0.06 | — | — | 0.230 | — | — | — | 0.000 | Bal. |
| A28 | 1.5 | — | 0.06 | — | — | 0.06 | 0.01 | — | 0.230 | — | — | — | 0.000 | Bal. |
| A29 | 1.5 | — | 0.06 | — | — | 0.06 | 0.15 | — | 0.230 | — | — | — | 0.000 | Bal. |
| A30 | 1.5 | — | 0.06 | — | — | 0.06 | 0.95 | — | 0.230 | — | — | — | 0.000 | Bal. |

TABLE 2

Component Composition (mass %)

| Alloy No. | Fe | Mn | Si | Ni | Cu | Mg | Cr | Zr | Zn | Ti | B | V | Ti + B + V | Al + unavoidable impurities |
|---|---|---|---|---|---|---|---|---|---|---|---|---|---|---|
| A31 | 1.5 | — | 0.06 | — | — | 0.02 | — | 0.01 | 0.230 | — | — | — | 0.000 | Bal. |
| A32 | 1.8 | — | 0.06 | — | — | 0.02 | — | 0.15 | 0.230 | — | — | — | 0.000 | Bal. |
| A33 | 1.8 | — | 0.06 | — | — | 0.02 | — | 0.95 | 0.230 | — | — | — | 0.000 | Bal. |
| A34 | 1.8 | — | 0.06 | — | — | 0.02 | — | — | 0.005 | — | — | — | 0.000 | Bal. |
| A35 | 1.5 | — | 0.06 | — | — | 0.02 | — | — | 0.350 | — | — | — | 0.000 | Bal. |
| A36 | 1.5 | — | 0.06 | — | — | 0.02 | — | — | 0.950 | — | — | — | 0.000 | Bal. |
| A37 | 0.8 | 0.3 | 0.06 | 0.1 | 0.020 | 0.02 | 0.15 | 0.15 | 0.350 | 0.005 | 0.001 | 0.001 | 0.007 | Bal. |
| A38 | 1.5 | 0.3 | 0.06 | 0.1 | 0.020 | 0.02 | 0.15 | 0.15 | 0.350 | 0.070 | 0.001 | 0.021 | 0.092 | Bal. |
| A39 | 2.3 | 0.3 | 0.06 | 0.1 | 0.020 | 0.02 | 0.15 | 0.15 | 0.350 | 0.454 | 0.023 | 0.012 | 0.489 | Bal. |
| A40 | 0.8 | — | 0.06 | — | — | 0.02 | — | — | — | — | — | — | 0.000 | Bal. |
| A41 | 1.2 | — | 0.06 | — | — | 0.02 | — | — | — | — | — | — | 0.000 | Bal. |
| A42 | 2.9 | — | 0.06 | — | — | 0.02 | — | — | — | — | — | — | 0.000 | Bal. |
| A43 | 1.5 | — | 0.06 | — | — | 0.02 | — | 0.01 | 0.230 | 0.010 | — | — | 0.010 | Bal. |
| A44 | 1.5 | — | 0.06 | — | — | 0.02 | — | 0.01 | 0.230 | 0.390 | — | — | 0.390 | Bal. |
| A45 | 1.5 | — | 0.06 | — | — | 0.02 | — | 0.01 | 0.230 | — | — | 0.010 | 0.010 | Bal. |
| A46 | 1.5 | — | 0.06 | — | — | 0.02 | — | 0.01 | 0.230 | — | — | 0.351 | 0.351 | Bal. |

TABLE 2-continued

| Alloy No. | Fe | Mn | Si | Ni | Cu | Mg | Cr | Zr | Zn | Ti | B | V | Ti + B + V | Al + unavoidable impurities |
|---|---|---|---|---|---|---|---|---|---|---|---|---|---|---|
| A47 | 1.5 | — | 0.06 | — | — | 0.02 | — | 0.01 | 0.230 | 0.050 | — | 0.050 | 0.100 | Bal. |
| A48 | 1.5 | — | 0.06 | — | — | 0.02 | — | 0.01 | 0.230 | 0.231 | — | 0.210 | 0.441 | Bal. |

TABLE 3

| Alloy No. | Fe | Mn | Si | Ni | Cu | Mg | Cr | Zr | Zn | Ti | B | V | Ti + B + V | Al + unavoidable impurities |
|---|---|---|---|---|---|---|---|---|---|---|---|---|---|---|
| AC1 | 0.2 | — | 0.06 | — | — | 0.02 | — | — | — | — | — | — | 0.000 | Bal. |
| AC2 | 0.2 | — | 0.06 | — | — | 0.02 | — | — | — | — | — | — | 0.000 | Bal. |
| AC3 | 0.3 | — | 0.06 | — | — | 0.02 | — | — | — | — | — | — | 0.000 | Bal. |
| AC4 | 3.5 | — | 0.06 | — | — | 0.02 | — | — | — | — | — | — | 0.000 | Bal. |
| AC5 | 4.0 | — | 0.06 | — | — | 0.02 | — | — | — | — | — | — | 0.000 | Bal. |
| AC6 | 0.8 | 3.5 | 0.06 | — | — | 0.02 | — | — | — | — | — | — | 0.000 | Bal. |
| AC7 | 0.8 | — | 0.20 | — | — | 0.02 | — | — | — | — | — | — | 0.000 | Bal. |
| AC8 | 0.8 | — | 0.06 | 3.6 | — | 0.02 | — | — | — | — | — | — | 0.000 | Bal. |
| AC9 | 0.8 | — | 0.06 | — | 1.520 | 0.02 | — | — | — | — | — | — | 0.000 | Bal. |
| AC10 | 0.8 | — | 0.06 | — | — | 0.20 | — | — | — | — | — | — | 0.000 | Bal. |
| AC11 | 0.8 | — | 0.06 | — | — | 0.02 | 1.40 | — | — | — | — | — | 0.000 | Bal. |
| AC12 | 0.8 | — | 0.06 | — | — | 0.02 | — | 1.38 | — | — | — | — | 0.000 | Bal. |
| AC13 | 0.8 | — | 0.06 | — | — | 0.02 | — | — | 1.520 | — | — | — | 0.000 | Bal. |
| AC14 | 0.8 | — | 0.06 | — | — | 0.02 | — | 0.230 | — | — | — | — | 0.000 | Bal. |
| AC15 | 0.8 | — | 0.06 | — | — | 0.02 | — | 0.230 | — | — | — | — | 0.000 | Bal. |

Then, the molten aluminum alloy was cast by a DC casting method, to produce an ingot having a thickness of 400 mm, and both surfaces of the ingot were faced in 15 mm (step S102). Then, the faced ingot was subjected to homogenization heat treatment at 550° C. for 10 hours (step S103). Then, the ingot was hot-rolled under conditions of a hot-rolling start temperature of 540° C. and a hot-rolling end temperature of 200° C. to make to make a hot-rolled sheet having a sheet thickness of 2.0 mm (step S104). Rolling reductions in a temperature range of 250 to 450° C. in the hot rolling are set forth in Tables 4 to 6.

TABLE 4

| | Alloy No. | Condition of Hot Rolling Rolling Reduction (%) in Temperature Range of 250 to 450° C. |
|---|---|---|
| Example 1 | A1 | 40 |
| Example 2 | A2 | 45 |
| Example 3 | A3 | 50 |
| Example 4 | A4 | 55 |
| Example 5 | A5 | 60 |
| Example 6 | A6 | 65 |
| Example 7 | A7 | 70 |
| Example 8 | A8 | 75 |
| Example 9 | A9 | 80 |
| Example 10 | A10 | 70 |
| Example 11 | A11 | 70 |
| Example 12 | A12 | 70 |
| Example 13 | A13 | 70 |
| Example 14 | A14 | 70 |
| Example 15 | A15 | 70 |
| Example 16 | A16 | 70 |
| Example 17 | A17 | 70 |
| Example 18 | A18 | 70 |
| Example 19 | A19 | 70 |
| Example 20 | A20 | 70 |
| Example 21 | A21 | 70 |
| Example 22 | A22 | 70 |
| Example 23 | A23 | 70 |
| Example 24 | A24 | 70 |
| Example 25 | A25 | 70 |
| Example 26 | A26 | 70 |
| Example 27 | A27 | 70 |
| Example 28 | A28 | 70 |
| Example 29 | A29 | 70 |
| Example 30 | A30 | 70 |

TABLE 5

| | Alloy No. | Condition of Hot Rolling Rolling Reduction (%) in Temperature Range of 250 to 450° C. |
|---|---|---|
| Example 31 | A31 | 70 |
| Example 32 | A32 | 70 |
| Example 33 | A33 | 70 |
| Example 34 | A34 | 70 |
| Example 35 | A35 | 70 |
| Example 36 | A36 | 70 |
| Example 37 | A37 | 70 |
| Example 38 | A38 | 70 |
| Example 39 | A39 | 70 |
| Example 40 | A40 | 70 |
| Example 41 | A41 | 70 |
| Example 42 | A42 | 70 |
| Example 43 | A43 | 70 |
| Example 44 | A44 | 70 |
| Example 45 | A45 | 70 |

TABLE 5-continued

| | Alloy No. | Condition of Hot Rolling Rolling Reduction (%) in Temperature Range of 250 to 450° C. |
|---|---|---|
| Example 46 | A46 | 70 |
| Example 47 | A47 | 70 |
| Example 48 | A48 | 70 |

TABLE 6

| | Alloy No. | Condition of Hot Rolling Rolling Reduction (%) in Temperature Range of 250 to 450° C. |
|---|---|---|
| Comparative Example 1 | AC1 | 70 |
| Comparative Example 2 | AC2 | 70 |
| Comparative Example 3 | AC3 | 70 |
| Comparative Example 4 | AC4 | 70 |
| Comparative Example 5 | AC5 | 70 |
| Comparative Example 6 | AC6 | 70 |
| Comparative Example 7 | AC7 | 70 |
| Comparative Example 8 | AC8 | 70 |
| Comparative Example 9 | AC9 | 70 |
| Comparative Example 10 | AC10 | 70 |
| Comparative Example 11 | AC11 | 70 |
| Comparative Example 12 | AC12 | 70 |
| Comparative Example 13 | AC13 | 70 |
| Comparative Example 14 | AC14 | 30 |
| Comparative Example 15 | AC15 | 25 |

After the hot rolling, the hot-rolled sheets of the alloy Nos. A1, A3, A5, and ACI were subjected to annealing (batch type) treatment under conditions of 360° C. and 2 hours. All the hot-rolled sheets produced in such a manner as described above were rolled to have a final sheet thickness of 0.8 mm by cold rolling (rolling reduction of 60.0%), to make aluminum alloy sheets (step S105). Annular portions having an outer diameter of 96 mm and an inner diameter of 24 mm were stamped from the aluminum alloy sheets to produce disk blanks (step S106).

Each disk blank produced in such a manner was subjected to pressurization flattening treatment at 250° C. for 3 hours under a pressure of 0.5 MPa (step S107). Then, the disk blank subjected to the pressurization flattening treatment was subjected to end-surface preparation to have an outer diameter of 95 mm and an inner diameter of 25 mm, and was subjected to grinding working (grinding of surface of 10 μm) to produce an aluminum alloy substrate (step S108). Then, the aluminum alloy substrate was degreased with AD-68F (trade name, manufactured by C. Uyemura & Co., Ltd.) at 60° C. for 5 minutes, acid-etched with AD-107F (trade name, manufactured by C. Uyemura & Co., Ltd.) at 65° C. for 1 minute, and further demutted with 30% HNO$_3$ aqueous solution (room temperature) for 20 seconds (step S109). The disk blank of which a surface state had been prepared in such a manner was immersed in a zincate treatment liquid, at 20° C., of AD-301F-3X (trade name, manufactured by C. Uyemura & Co., Ltd.) for 0.5 minute to perform zincate treatment of the surface (step S109). The zincate treatment was performed twice in total, and the disk blank was immersed in 30% HNO$_3$ aqueous solution at room temperature for 20 seconds between such zincate treatments to subject the surface to peeling treatment. The surface subjected to the zincate treatment was electroless plated with Ni—P of 15 μm in thickness using an electroless Ni—P plating treatment liquid (NIMUDEN HDX (trade name, manufactured by C. Uyemura & Co., Ltd.)) and then subjected to final polishing (polishing quantity of 4.5 μm) by a fabric to make an aluminum alloy substrate for a magnetic disk substrate disk (step S110).

The aluminum alloy sheet subjected to the cold rolling (step S105), the disk blank subjected to the pressurization flattening treatment (step S107), the aluminum alloy substrate subjected to the grinding work (step S108) step, and the aluminum alloy substrate subjected to the plating treatment polishing (step S110) step were subjected to the following evaluations. Plating treatment of five disks was performed in each sample. In Comparative Examples 4 to 15, however, plating peeling occurred in all the five disks, and therefore, it was impossible to measure disk flutter. Plating peeling occurred in one of the five disks in Example 1, in two of the five disks in Examples 40 and 41, and in three of the five disks in Example 42, but the evaluations were performed using the disks in which the plating peeling had not occurred.

[Tensile Strength]

Tensile strength was measured in conformity with JISZ2241 by performing annealing (pressurization flattening treatment simulated heating), at 250° C. for 3 hours, of the aluminum alloy sheet subjected to the cold rolling (step S105), then sampling JIS No. 5 test pieces along the rolling direction, and setting n=2. In the evaluation of the strength, a tensile strength of 130 MPa or more was evaluated as A (excellent), a tensile strength of 110 MPa or more and less than 130 MPa was evaluated as B (good), a tensile strength of 90 MPa or more and less than 110 MPa was evaluated as C (fair), and a tensile strength of less than 90 MPa was evaluated as D (poor).

[Distribution Densities of Al—Fe-Based Intermetallic Compound and Mg—Si-Based Intermetallic Compound]

A cross section of the aluminum alloy substrate subjected to the grinding work (step S108) was polished, followed by observing a region of an observation visual field of 1 mm$^2$ with an optical microscope at a magnification of 400 times to measure the longest diameters and distribution densities (particles/mm$^2$) of the intermetallic compounds by using particle analysis software A-ZO-KUN (trade name, manufactured by Asahi Kasei Engineering Corporation). In the measurement, the cross section in a portion of ¼ of the sheet thickness from a surface in a thickness direction was used.

[Measurement of Disk Flutter]

Disk flutter was measured using the aluminum alloy substrate subjected to the plating treatment polishing (step S110) step. The disk flutter was measured by placing the aluminum alloy substrate on a commercially available hard disk drive in the presence of air. ST2000 (trade name) manufactured by Seagate was used as the drive, and a motor to which SLD102 (trade name) manufactured by Techno Alive Co. was directly connected was driven. Plural disks at a rotation number set at 7200 rpm were always placed, and the vibrations of a surface of the top magnetic disk of the disks were observed with LDV1800 (trade name), as a laser Doppler meter, manufactured by ONO SOKKI CO., LTD.

The observed vibrations were subjected to spectrum analysis with an FFT analysis apparatus DS3200 (trade name) manufactured by ONO SOKKI CO., LTD. The observation was performed by observing the disk surface through a hole opened in the lid of the hard disk drive. In addition, a squeeze plate placed in the commercially available hard disk was removed, and the evaluation was performed.

A fluttering characteristic was evaluated with the maximum displacement (disk fluttering (nm)) of a broad peak in the vicinity of 300 to 1500 Hz at which fluttering appears. Such a broad peak, referred to as non-repeatable run out (NRRO), has been found to greatly influence the positioning error of a head. In air, a fluttering characteristic of 30 nm or less was evaluated as A (excellent), a fluttering characteristic of more than 30 nm and 40 nm or less was evaluated as B (good), a fluttering characteristic of more than 40 nm and 50 nm or less was evaluated as C (fair), and a fluttering characteristic of more than 50 nm was evaluated as D (poor).

[Flatness]

The flatnesses of the 50 blanks subjected to the pressurization flattening treatment were measured with a flatness measurement instrument. A blank of which the maximum value of the flatness was 20 μm or less was evaluated as A (excellent), a blank of which the maximum value of the flatness was more than 20 μm and less than 30 μm was evaluated as B (good), and a blank of which the maximum value of the flatness was 30 μm or more was evaluated as D (poor). Such a flatness is a value measured with a ZyGO non-contact flatness measurement machine.

[Smoothness of Aluminum Alloy Substrate for Magnetic Disk Subjected to Undercoat Treatment]

The number of fine pits on the surface of the aluminum alloy substrate subjected to the plating treatment polishing (step S110) step was determined. The number of fine pits with a size having a longest diameter of 0.4 μm or more and less than 0.9 μm in an observation visual field of 1 mm$^2$ was measured with an SEM at a magnification of 2000 times, to determine the number of pits per unit area (number density: pits/mm$^2$).

In a planar image of fine pits observed with an SEM, first, a maximum value of the distance between one point on a contour and another point on the contour is measured, such maximum values with regard to all the points on the contour are then measured, and the highest value is finally selected from all the maximum values; and the longest diameter of the fine pits refers to the highest value. In addition, the lower limit of the longest diameter of the fine pits is not limited. However, any fine pits having a longest diameter of less than 0.4 μm were not observed, and were therefore regarded as inapplicable. Not only in a case in which the whole of a pit existed in the observation visual field of 1 mm$^2$ but also in a case in which a part of a pit was observed, such a pit was counted as one. A case in which the number density of fine pits was 0 pit/mm$^2$ was evaluated as A (excellent), a case in which the number density of fine pits was 1 to 7 pits/mm$^2$ was evaluated as B (good), and a case in which the number density of fine pits was 8 pits/mm$^2$ or more was evaluated as D (poor), on the basis of evaluation criteria.

The above evaluation results are set forth in Tables 7 to 9.

TABLE 7

| | Alloy No. | Distribution Density of Al—Fe-Based Intermetallic Compound Having Longest Diameter of 2 μm or More and Less Than 3 μm (particles/mm$^2$) | Distribution Density of Mg—Si-Based Intermetallic Compound Having Longest Diameter of 1 μm or More (particles/mm$^2$) | Strength Tensile Strength (MPa) | Evaluation | Fluttering Characteristic | Flatness (μm) | Smoothness of Plated Surface Distribution of Plating Pits (Fine Pits) Having Longest Diameter of 0.4 μm or More and Less Than 0.9 μm (pits/mm$^2$) | Evaluation |
|---|---|---|---|---|---|---|---|---|---|
| Example 1 | A1 | 1205 | 1 | 93 | C | B | 1 | 6 | B |
| Example 2 | A2 | 3201 | 1 | 115 | B | A | 7 | 5 | B |
| Example 3 | A3 | 5601 | 0 | 132 | A | A | 5 | 0 | A |
| Example 4 | A4 | 9405 | 0 | 133 | A | A | 4 | 0 | A |
| Example 5 | A5 | 10003 | 0 | 135 | A | A | 5 | 0 | A |
| Example 6 | A6 | 12003 | 0 | 134 | A | A | 4 | 0 | A |
| Example 7 | A7 | 15405 | 0 | 137 | A | A | 5 | 0 | A |
| Example 8 | A8 | 18005 | 0 | 185 | A | A | 4 | 0 | A |
| Example 9 | A9 | 20005 | 0 | 140 | A | A | 18 | 0 | A |
| Example 10 | A10 | 29008 | 0 | 145 | A | A | 28 | 5 | B |
| Example 11 | A11 | 15204 | 0 | 139 | A | A | 4 | 0 | A |
| Example 12 | A12 | 15604 | 0 | 184 | A | A | 5 | 0 | A |
| Example 13 | A13 | 16204 | 0 | 200 | A | A | 4 | 0 | A |
| Example 14 | A14 | 18005 | 0 | 230 | A | A | 18 | 0 | A |
| Example 15 | A15 | 20806 | 0 | 280 | A | A | 25 | 3 | B |
| Example 16 | A16 | 15304 | 0 | 132 | A | A | 3 | 0 | A |
| Example 17 | A17 | 14321 | 0 | 133 | A | A | 5 | 0 | A |
| Example 18 | A18 | 15205 | 0 | 135 | A | A | 3 | 0 | A |
| Example 19 | A19 | 17017 | 0 | 178 | A | A | 3 | 0 | A |
| Example 20 | A20 | 20843 | 0 | 204 | A | A | 28 | 2 | B |
| Example 21 | A21 | 13204 | 0 | 132 | A | A | 3 | 0 | A |
| Example 22 | A22 | 15081 | 0 | 141 | A | A | 5 | 0 | A |
| Example 23 | A23 | 15231 | 0 | 152 | A | A | 3 | 0 | A |
| Example 24 | A24 | 15112 | 0 | 189 | A | A | 3 | 0 | A |
| Example 25 | A25 | 15981 | 0 | 134 | A | A | 5 | 0 | A |
| Example 26 | A26 | 14321 | 0 | 132 | A | A | 3 | 0 | A |
| Example 27 | A27 | 16311 | 0 | 133 | A | A | 3 | 0 | A |

TABLE 7-continued

| | | Distribution Density of Al—Fe-Based Intermetallic Compound Having Longest Diameter of 2 μm or More and Less Than 3 μm (particles/mm²) | Distribution Density of Mg—Si-Based Intermetallic Compound Having Longest Diameter of 1 μm or More (particles/mm²) | Strength | | Fluttering Charac- teristic | Flat- ness (μm) | Smoothness of Plated Surface | |
|---|---|---|---|---|---|---|---|---|---|
| | Alloy No. | | | Tensile Strength (MPa) | Evalu- ation | | | Distribution of Plating Pits (Fine Pits) Having Longest Diameter of 0.4 μm or More and Less Than 0.9 μm (pits/mm²) | Evalu- ation |
| Example 28 | A28 | 15324 | 0 | 131 | A | A | 3 | 0 | A |
| Example 29 | A29 | 15304 | 0 | 138 | A | A | 3 | 0 | A |
| Example 30 | A30 | 16907 | 0 | 153 | A | A | 3 | 0 | A |

TABLE 8

| | | Distribution Density of Al—Fe-Based Intermetallic Compound Having Longest Diameter of 2 μm or More and Less Than 3 μm (particles/mm²) | Distribution Density of Mg—Si-Based Intermetallic Compound Having Longest Diameter of 1 μm or More (particles/mm²) | Strength | | Fluttering Charac- teristic | Flat- ness (μm) | Smoothness of Plated Surface | |
|---|---|---|---|---|---|---|---|---|---|
| | Alloy No. | | | Tensile Strength (MPa) | Evalu- ation | | | Distribution of Plating Pits (Fine Pits) Having Longest Diameter of 0.4 μm or More and Less Than 0.9 μm (pits/mm²) | Evalu- ation |
| Example 31 | A31 | 14324 | 0 | 145 | A | A | 3 | 0 | A |
| Example 32 | A32 | 18235 | 0 | 187 | A | A | 7 | 0 | A |
| Example 33 | A33 | 18812 | 0 | 201 | A | A | 27 | 0 | A |
| Example 34 | A34 | 17315 | 0 | 132 | A | A | 3 | 0 | A |
| Example 35 | A35 | 15814 | 0 | 132 | A | A | 3 | 0 | A |
| Example 36 | A36 | 16531 | 0 | 134 | A | A | 3 | 0 | A |
| Example 37 | A37 | 9104 | 0 | 198 | A | A | 5 | 0 | A |
| Example 38 | A38 | 16106 | 0 | 214 | A | A | 8 | 0 | A |
| Example 39 | A39 | 24108 | 0 | 251 | A | A | 24 | 0 | A |
| Example 40 | A40 | 8302 | 0 | 132 | A | A | 4 | 0 | A |
| Example 41 | A41 | 12033 | 0 | 143 | A | A | 5 | 0 | A |
| Example 42 | A42 | 29318 | 0 | 189 | A | A | 25 | 0 | A |
| Example 43 | A43 | 14532 | 0 | 147 | A | A | 3 | 0 | A |
| Example 44 | A44 | 14124 | 0 | 149 | A | A | 3 | 0 | A |
| Example 45 | A45 | 15311 | 0 | 146 | A | A | 4 | 0 | A |
| Example 46 | A46 | 15542 | 0 | 148 | A | A | 3 | 0 | A |
| Example 47 | A47 | 14185 | 0 | 149 | A | A | 4 | 0 | A |
| Example 48 | A48 | 15743 | 0 | 152 | A | A | 4 | 0 | A |

TABLE 9

| | | Distribution Density of Al—Fe-Based Intermetallic Compound Having Longest Diameter of 2 μm or More and Less Than 3 μm (particles/mm2) | Distribution Density of Mg—Si-Based Intermetallic Compound Having Longest Diameter of 1 μm or More (particles/mm²) | Strength | | Fluttering Charac- teristic | Flat- ness (μm) | Smoothness of Plated Surface | |
|---|---|---|---|---|---|---|---|---|---|
| | Alloy No. | | | Tensile Strength (MPa) | Evalu- ation | | | Distribution of Plating Pits (Fine Pits) Having Longest Diameter of 0.4 μm or More and Less Than 0.9 μm (pits/mm²) | Evalu- ation |
| Comparative Example 1 | AC1 | 843 | 0 | 80 | D | D | 3 | 12 | D |
| Comparative Example 2 | AC2 | 712 | 0 | 82 | D | D | 5 | 15 | D |
| Comparative Example 3 | AC3 | 893 | 0 | 85 | D | D | 4 | 18 | D |
| Comparative Example 4 | AC4 | 35029 | 0 | 183 | A | — | 21 | 0 | A |
| Comparative Example 5 | AC5 | 43011 | 0 | 195 | A | — | 24 | 0 | A |

TABLE 9-continued

| | Alloy No. | Distribution Density of Al—Fe-Based Intermetallic Compound Having Longest Diameter of 2 μm or More and Less Than 3 μm (particles/mm2) | Distribution Density of Mg—Si-Based Intermetallic Compound Having Longest Diameter of 1 μm or More (particles/mm²) | Strength | | Fluttering Characteristic | Flatness (μm) | Smoothness of Plated Surface | |
|---|---|---|---|---|---|---|---|---|---|
| | | | | Tensile Strength (MPa) | Evaluation | | | Distribution of Plating Pits (Fine Pits) Having Longest Diameter of 0.4 μm or More and Less Than 0.9 μm (pits/mm²) | Evaluation |
| Comparative Example 6 | AC6 | 15124 | 0 | 152 | A | — | 35 | 32 | D |
| Comparative Example 7 | AC7 | 8122 | 3 | 123 | A | — | 8 | 9 | D |
| Comparative Example 8 | AC8 | 15250 | 0 | 183 | A | — | 21 | 0 | A |
| Comparative Example 9 | AC9 | 8302 | 0 | 145 | A | — | 9 | 0 | A |
| Comparative Example 10 | AC10 | 8839 | 5 | 123 | A | — | 5 | 10 | D |
| Comparative Example 11 | AC11 | 10806 | 0 | 165 | A | — | 21 | 0 | A |
| Comparative Example 12 | AC12 | 9189 | 0 | 201 | A | — | 42 | 49 | D |
| Comparative Example 13 | AC13 | 8381 | 0 | 134 | A | — | 4 | 0 | A |
| Comparative Example 14 | AC14 | 738 | 0 | 121 | A | A | 3 | 11 | D |
| Comparative Example 15 | AC15 | 810 | 0 | 122 | A | A | 5 | 12 | D |

As set forth in Tables 7 and 8, Examples 1 to 48 were able to result in favorable strength and fluttering characteristic.

In contrast, Comparative Examples 1 to 3 resulted in poor strength and poor fluttering characteristic due to the too small content of Fe in an aluminum alloy. In addition, due to the small amount of Al—Fe-based intermetallic compound, a large number of fine pits were generated on a plated surface, thereby resulting in the poor smoothness of the plated surface.

Comparative Examples 4 and 5 resulted in occurrence of plating peeling in such a manner as described above due to the too large content of Fe in an aluminum alloy, thereby preventing a fluttering characteristic from being evaluated, and were inappropriate for a magnetic disk.

Comparative Example 6 resulted in occurrence of plating peeling in such a manner as described above due to the too large content of Mn in an aluminum alloy, thereby preventing a fluttering characteristic from being evaluated, and was inappropriate for a magnetic disk.

Comparative Example 7 resulted in occurrence of plating peeling in such a manner as described above due to the too large content of Si in an aluminum alloy, thereby preventing a fluttering characteristic from being evaluated, and was inappropriate for a magnetic disk. In addition, the presence of a large amount of Mg—Si-based intermetallic compound caused a large number of fine pits to be generated on a plated surface, thereby deteriorating the smoothness of the plated surface.

Comparative Example 8 resulted in occurrence of plating peeling in such a manner as described above due to the too large content of Ni in an aluminum alloy, thereby preventing a fluttering characteristic from being evaluated, and was inappropriate for a magnetic disk.

Comparative Example 9 resulted in occurrence of plating peeling in such a manner as described above due to the too large content of Cu in an aluminum alloy, thereby preventing a fluttering characteristic from being evaluated, and was inappropriate for a magnetic disk.

Comparative Example 10 resulted in occurrence of plating peeling in such a manner as described above due to the too large content of Mg in an aluminum alloy, thereby preventing a fluttering characteristic from being evaluated, and was inappropriate for a magnetic disk. In addition, the presence of a large amount of Mg—Si-based intermetallic compound caused a large number of fine pits to be generated on a plated surface, thereby deteriorating the smoothness of the plated surface.

Comparative Example 11 resulted in occurrence of plating peeling in such a manner as described above due to the too large content of Cr in an aluminum alloy, thereby preventing a fluttering characteristic from being evaluated, and was inappropriate for a magnetic disk.

Comparative Example 12 resulted in occurrence of plating peeling in such a manner as described above due to the too large content of Zr in an aluminum alloy, thereby preventing a fluttering characteristic from being evaluated, and was inappropriate for a magnetic disk.

Comparative Example 13 resulted in occurrence of plating peeling in such a manner as described above due to the too large content of Zn in an aluminum alloy, thereby preventing a fluttering characteristic from being evaluated, and was inappropriate for a magnetic disk.

Comparative Examples 14 and 15 resulted in a small amount of Al—Fe-based intermetallic compound due to a too low rolling reduction in a temperature range of 250 to 450° C. in hot rolling, and therefore resulted in generation of a large number of fine pits on a plated surface, thereby resulting in the poor smoothness of the plated surface.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

In accordance with the present disclosure, there can be provided an aluminum alloy substrate for a magnetic disk, having a favorable plating property and an excellent disk fluttering characteristic, a method for producing the same, and a magnetic disk using the aluminum alloy substrate for a magnetic disk.

The invention claimed is:

1. An aluminum alloy substrate for a magnetic disk, the aluminum alloy substrate comprising an aluminum alloy comprising 0.4 to 3.0 mass % of Fe, less than 0.10 mass % of Si, less than 0.10 mass % of Mg, and a balance of Al and unavoidable impurities,
wherein an Al—Fe-based intermetallic compound having a longest diameter of 2 μm or more and less than 3 μm is dispersed at a distribution density of 1000 particles/$mm^2$ or more, and a Mg—Si-based intermetallic compound having a longest diameter of 1 μm or more is dispersed at a distribution density of 1 particle/$mm^2$ or less.

2. The aluminum alloy substrate for a magnetic disk according to claim 1,
wherein the aluminum alloy further comprises one or more selected from a group consisting of 0.1 to 3.0 mass % of Mn, 0.1 to 3.0 mass % of Ni, 0.005 to 1.000 mass % of Cu, 0.01 to 1.00 mass % of Cr, and 0.01 to 1.00 mass % of Zr.

3. The aluminum alloy substrate for a magnetic disk according to claim 1,
wherein the aluminum alloy further comprises 0.005 to 1.000 mass % of Zn.

4. The aluminum alloy substrate for a magnetic disk according to claim 1,
wherein the aluminum alloy further comprises one or more selected from a group consisting of Ti, B, and V in a total content of 0.005 to 0.500 mass % or less.

5. The aluminum alloy substrate for a magnetic disk according to claim 1,
wherein a flatness is 30 μm or less.

6. The aluminum alloy substrate for a magnetic disk according to claim 1,
wherein a tensile strength is 90 MPa or more.

7. A magnetic disk wherein an electroless Ni—P plating treatment layer and a magnetic layer thereon are disposed on a surface of the aluminum alloy substrate for a magnetic disk according to claim 1.

8. The aluminum alloy substrate for a magnetic disk according to claim 2,
wherein the aluminum alloy further comprises 0.005 to 1.000 mass % of Zn.

9. The aluminum alloy substrate for a magnetic disk according to claim 2,
wherein the aluminum alloy further comprises one or more selected from a group consisting of Ti, B, and V in a total content of 0.005 to 0.500 mass % or less.

10. The aluminum alloy substrate for a magnetic disk according to claim 3,
wherein the aluminum alloy further comprises one or more selected from a group consisting of Ti, B, and V in a total content of 0.005 to 0.500 mass % or less.

11. The aluminum alloy substrate for a magnetic disk according to claim 8,
wherein the aluminum alloy further comprises one or more selected from a group consisting of Ti, B, and V in a total content of 0.005 to 0.500 mass % or less.

12. A method for producing an aluminum alloy substrate for a magnetic disk according to claim 1, the method comprising:
a casting step of casting an ingot by using the aluminum alloy;
a hot-rolling step of hot-rolling the ingot;
a cold-rolling step of cold-rolling a hot-rolled sheet;
a disk blank stamping step of stamping the cold-rolled sheet to have an annular shape;
a pressurization annealing step of subjecting a stamped disk blank to pressurization annealing; and
a cutting and grinding step of subjecting the disk blank subjected to the pressurization annealing, to cutting work and grinding work,
wherein the ingot is hot-rolled at a rolling reduction of 40% or more in a temperature range of 250 to 450° C. in the hot-rolling step.

13. The method for producing an aluminum alloy substrate for a magnetic disk according to claim 12, the method further comprising a homogenization heat treatment step of heat-treating the ingot at 280 to 620° C. for 0.5 to 60 hours between the casting step and the hot-rolling step.

14. The method for producing an aluminum alloy substrate for a magnetic disk according to claim 12, the method further comprising an annealing treatment step of annealing the rolled sheet, the annealing treatment step being a batch annealing treatment step performed at 300 to 390° C. for 0.1 to 10 hours or a continuous annealing treatment step performed at 400 to 500° C. for 0 to 60 seconds, before or in the cold-rolling step.

* * * * *